US012319559B1

(12) United States Patent
Lai

(10) Patent No.: US 12,319,559 B1
(45) Date of Patent: Jun. 3, 2025

(54) LIQUID PUMP WITH ADJUSTABLE LENGTH AND FEED TANK

(71) Applicant: ZHONGSHAN PEILI TECHNOLOGY CO., LTD., Guangdong (CN)

(72) Inventor: Chunlai Lai, Jiangxi (CN)

(73) Assignee: ZHONGSHAN PEILI TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/039,699

(22) Filed: Jan. 28, 2025

(51) Int. Cl.
*B67D 7/58* (2010.01)
*B67D 7/00* (2010.01)
*B67D 7/62* (2010.01)

(52) U.S. Cl.
CPC ............... *B67D 7/002* (2013.01); *B67D 7/62* (2013.01)

(58) Field of Classification Search
CPC . B67D 7/002; B67D 7/58; B67D 7/62; B67D 7/645
See application file for complete search history.

(56) References Cited

U.S. PATENT DOCUMENTS

| | | | | |
|---|---|---|---|---|
| 11,898,697 B1 * | 2/2024 | Park | F16N 37/00 |
| 2004/0070205 A1 * | 4/2004 | Thomas | F16L 37/0985 285/35 |

* cited by examiner

*Primary Examiner* — Paul J Gray
(74) *Attorney, Agent, or Firm* — Daniel M. Cohn

(57) ABSTRACT

A liquid pump with adjustable length and a feed tank are provided. The liquid pump includes a tube component, a pump body, a sealing ring, and a fixing piece. The tube component includes a first tube and a second tube, the first tube and the second tube are sleeved with each other, the first tube is slidable relative to the second tube. The pump body is mounted in a first end of the first tube away from the second tube. The sealing ring is hermetically connected between the first tube and the second tube. The fixing piece is sleeved on the first tube and the second tube. The fixing piece is configured to fix the first tube and the second tube. A length of the tube component is flexibly adjusted to match tanks of different depths, while taking into account sealing and stability.

16 Claims, 6 Drawing Sheets

LIQUID PUMP WITH ADJUSTABLE LENGTH AND FEED TANK

TECHNICAL FIELD

The present disclosure relates to a field of liquid pumping, and in particular to a liquid pump with adjustable length and a feed tank.

BACKGROUND

In a field of liquid pump technology, designs of conventional integrated liquid pumps have obvious limitations. The conventional integrated liquid pumps generally have a fixed length and are unable to be flexibly adjusted according to a depth of an oil barrel. Therefore, when applied to oil barrels of different specifications, it is often necessary to use a longest liquid pump to meet needs of one of the oil barrels that is deep. However, when the longest liquid pump is used for one of the oil barrels that is relatively shallow, an exposed portion thereof is too much, which not only affects safety of use, but also increases cost of packaging and transportation.

SUMMARY

The present disclosure provides a liquid pump with adjustable length and a feed tank. A length of a tube component of the liquid pump is flexibly adjusted to match tanks of different depths, while taking into account sealing and stability.

In a first aspect, the present disclosure provides a liquid pump with adjustable length. The liquid pump comprises a tube component, a pump body, a sealing ring, and a fixing piece.

The tube component comprises a first tube and a second tube, the first tube and the second tube are sleeved with each other, the first tube is slidable relative to the second tube. The pump body is mounted in a first end of the first tube away from the second tube. The sealing ring is hermetically connected between the first tube and the second tube. The fixing piece is sleeved on the first tube and the second tube. The fixing piece is configured to fix the first tube and the second tube.

Optionally, the first tube comprises a second end away from the pump body. The second end of the first tube is disposed in the second tube. An outer periphery of the second end of the first tube defines an accommodating groove. The sealing ring is disposed in the accommodating groove.

Optionally, the second tube comprises a first end sleeved with the first tube. A protrusion is disposed on an inner side of the first end of the second tube.

The second end of the first tube defines a limiting portion. The limiting portion is disposed on one side of the protrusion away from the pump body. The limiting portion cooperates with the protrusion to limit the first tube from being separated from the second tube.

Optionally, the limiting portion comprises a step structure disposed on the outer periphery of the second end of the first tube. The step structure is disposed on one side of the accommodating groove facing the pump body.

Optionally, at least part of areas of cross sections of the second end of the first tube gradually decreases in a direction away from the pump body.

Optionally, the fixing piece comprises a movable nut. A thread is disposed on an outer periphery of the first end of the second tube. The movable nut is screwed with the first end of the second tube, so that the first tube is fixed to the second tube.

Optionally, the liquid pump further comprises a clamping portion. The clamping portion is disposed between the first tube and the fixing piece. The clamping portion is configured to limit the first tube from sliding relative to the second tube.

Optionally, a limiting groove is defined on the outer periphery of the second end of the first tube. The clamping portion is disposed in the limiting groove to limit the first tube from being separated from the second tube.

Optionally, the clamping portion is not elastically deformed when disposed in the limiting groove.

Optionally, the clamping portion is elastic. When the clamping portion is disposed outside the limiting groove. The clamping portion is elastically deformed and clamped between the first tube and the fixing piece.

Optionally, the clamping portion comprises a clamping ring. The clamping ring defines a notch, so that the clamping ring is elastically deformable along a radial direction of the first tube.

Optionally, the fixing piece comprises a sleeve portion and a limiting end portion, the sleeve portion is sleeved on the second tube. A first end of the sleeve portion facing the pump body exceeds the second tube and is disposed opposite to the first tube. A second end of the sleeve portion facing he pump body defines the limiting end portion protruding toward the first tube. The clamping portion is disposed between the second tube and the limiting end portion.

Optionally, when the movable nut is tightened. The clamping portion abuts between the second tube and the limiting end portion.

Optionally, the clamping portion is disposed on one side of the sealing ring facing the pump body.

Optionally, a protruding ring is disposed on the outer periphery of the first end of the second tube, and the protruding ring is disposed adjacent to the thread and is disposed on one side of the thread away from the pump body.

Optionally, the liquid pump further comprises a liquid outlet device. The liquid outlet device is connected to a second end of the second tube away from the first tube. The liquid outlet device is configured to control discharge of a liquid.

Optionally, the first tube and the second tube extend along a first direction. The liquid pump further comprises a third tube. The third tube extends along a second direction. The second tube is connected to the liquid outlet device through the third tube. The first direction is different from the second direction.

Optionally, the sealing ring is made from an elastic material.

in a second aspect, the present disclosure provides a feed tank. The feed tank comprises a tank configured to store a liquid and the liquid pump mentioned above. The liquid pump is mounted in the tank. The liquid pump is configured to discharge the liquid stored in the tank.

The liquid pump with adjustable length of the embodiments of the present disclosure comprises the first tube and the second tube, the first tube and the second tube are sleeved with each other, and the first tube is slidable relative to the second tube, so that the length of the tube component is flexibly adjusted according to a depth of the tank. Therefore, the liquid pump is capable of matching tanks of different depths, and is adapt to the tank that is deep, which avoids excessive exposure of the tube component in the tank that is shallow, thereby ensuring safety and convenience of use of the liquid pump. Moreover, since the tube component is telescopic, the tube component is retracted to a shortest state during storage or transportation, reducing transportation costs and storage space requirements. The sealing ring is mounted between the first tube and the second tube, and is configured to seal a gap between the first tube and the second tube, ensuring that when the first tube slides to any position relative to the second tube, the gap between the first tube and the second tube is effectively sealed, thereby preventing the liquid from leaking from the gap between the first tube and the second tube during a liquid pumping process, thereby ensuring the sealing and safety of the liquid pumping process. The fixing piece is sleeved on an outer side of the first tube and an outer side of the second tube. The fixing piece is configured to fix the first tube and the second tube after the first tube and the second tube are adjusted to a suitable position, ensuring that the first tube and the second tube are stably maintained in the suitable position after being extended and retracted, preventing the tube component from accidentally extending and retracting during use, thereby improving the safety and stability of the liquid pump. Therefore, the liquid pump of the embodiments of the present disclosure realizes flexible adjustment of the length of the tube component, while taking into account sealing, stability and ease of use.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description will be made in conjunction with the accompanying drawings, where same reference numbers in the following description indicate same structures.

REFERENCE NUMERALS IN THE DRAWINGS

1—liquid pump; 10—tube component; 12—first tube; 122—second end of the first tube; 123—accommodating groove; 124—limiting portion; 126—limiting groove; 14—second tube; 142—first end of the second tube; 143—protrusion; 144—protruding ring; 20—pump body; 30—sealing ring; 40—fixing piece; 42—movable nut; 44—sleeve portion; 46—limiting end portion; 50—clamping portion; 52—clamping ring; 53—notch; 60—liquid outlet device; 70—third tube.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. The following description of at least one exemplary embodiment is merely illustrative and is in no way intended as any limitation on the present disclosure, applications thereof, and use thereof. Based on the embodiments of the present disclosure, all other embodiments obtained by those of ordinary skill in the art without creative work shall fall within the protection scope of the present disclosure.

Reference herein to "embodiment" or "implement" means that a particular feature, structure, or characteristic described in connection with one embodiment or one implement may be included in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

Figure 1:
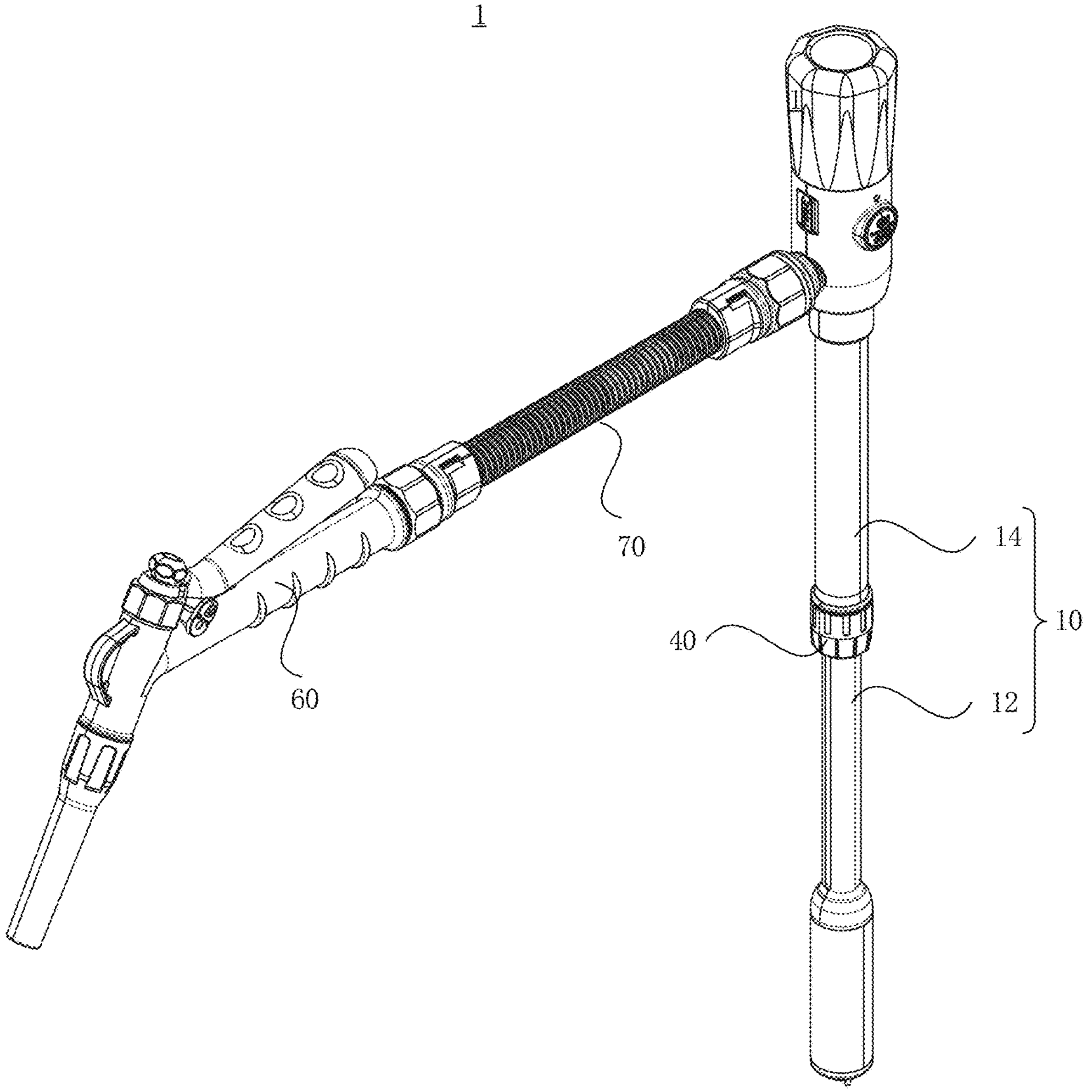
FIG. 1 is a structural schematic diagram of a liquid pump with adjustable length according to one embodiment of the present disclosure.
Figure 2:
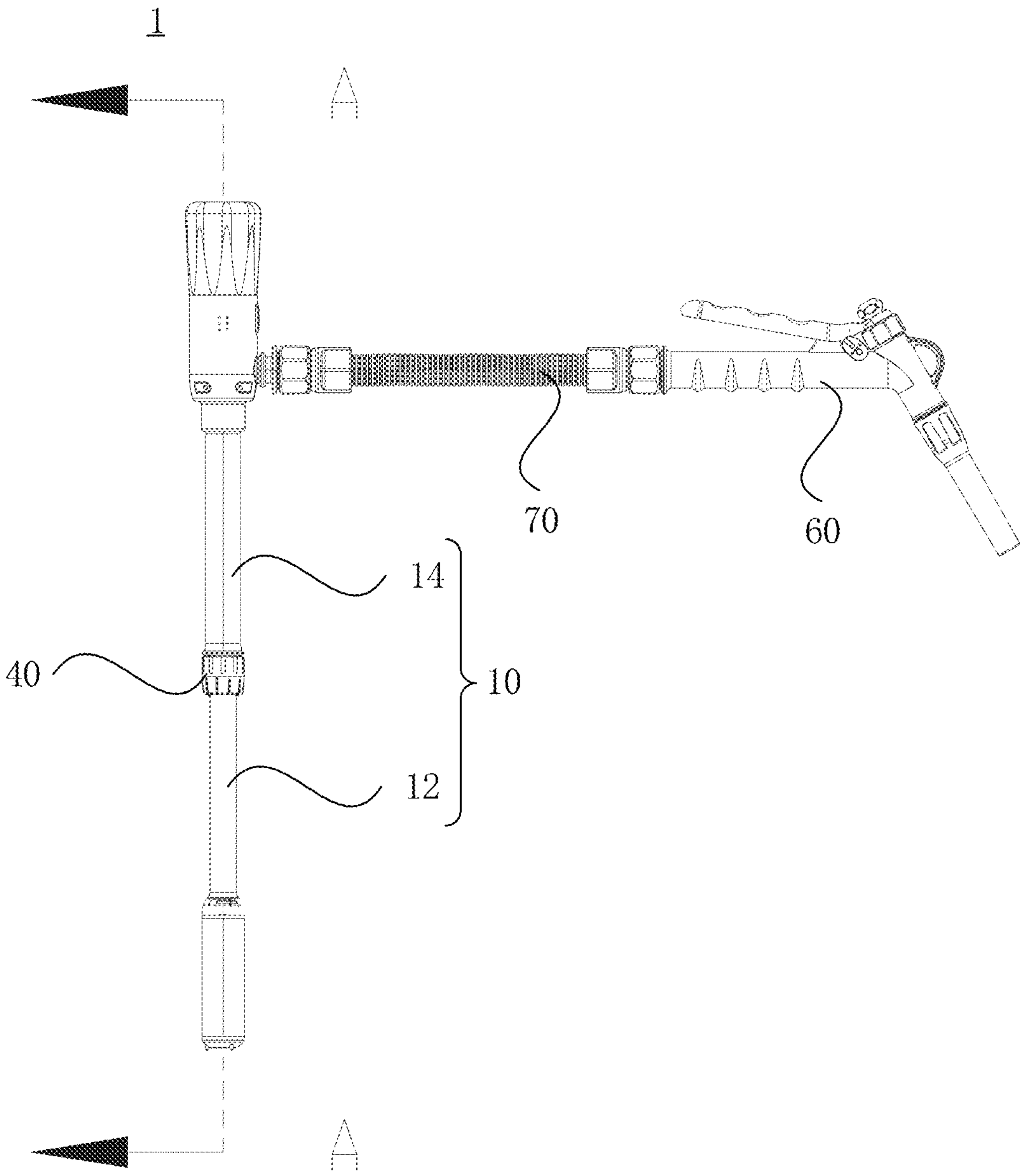
FIG. 2 is another structural schematic diagram of the liquid pump with adjustable length according to one embodiment of the present disclosure.
Figure 3:
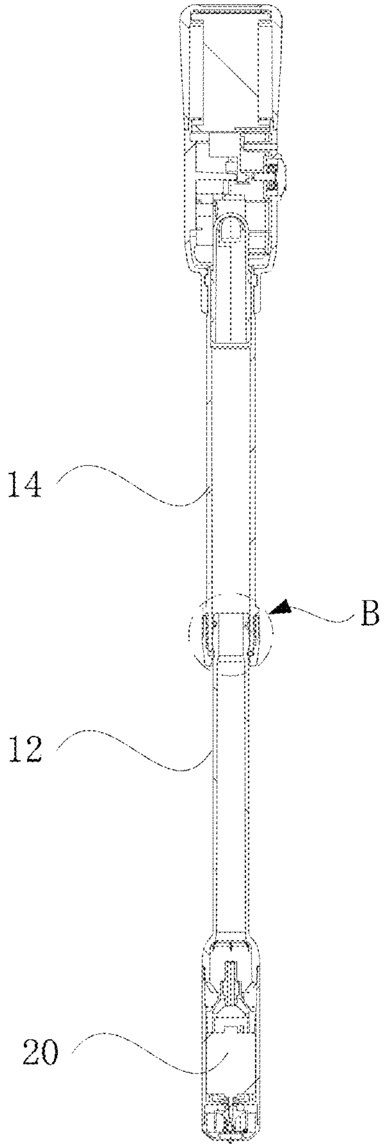
FIG. 3 is a cross-sectional schematic diagram of the liquid pump with adjustable length taken along a line A-A shown in FIG. 2.
Figure 4:
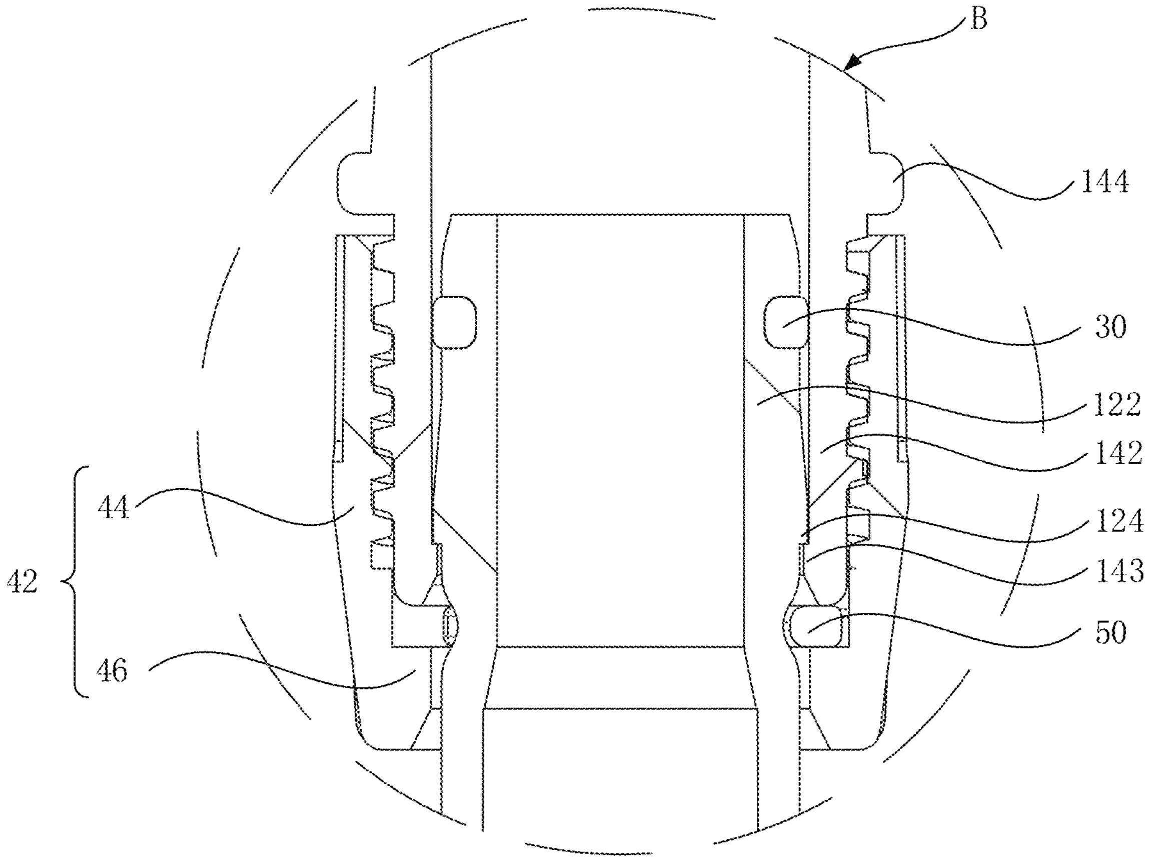
FIG. 4 is an enlarged schematic diagram of portion B of the liquid pump with adjustable length shown in FIG. 3.

A conventional integrated liquid pump has a fixed length and is unable to be flexibly adjusted according to an actual depth of an oil barrel, resulting in either the length of the conventional integrated liquid pump being too long and being exposed too much, increasing a risk of use, or the length of the conventional integrated liquid pump being insufficient and unable to meet oil pumping needs. In view of defects in the prior art, the present disclosure provides a liquid pump with adjustable length. As shown in FIGS. 1-4. FIG. 1 is a structural schematic diagram of the liquid pump with adjustable length according to one embodiment of the present disclosure, FIG. 2 is another structural schematic diagram of the liquid pump with adjustable length according to one embodiment of the present disclosure, FIG. 3 is a cross-sectional schematic diagram of the liquid pump with adjustable length taken along a line A-A shown in FIG. 2, and FIG. 4 is an enlarged schematic diagram of portion B of the liquid pump with adjustable length shown in FIG. 3.

The liquid pump comprises a tube component 10, a pump body 20, a sealing ring 30, and a fixing piece 40. The tube component 10 comprises a first tube 12 and a second tube 14, the first tube 12 and the second tube 14 are sleeved with each other. The first tube 12 is slidable relative to the second tube 14. The pump body 20 is mounted in a first end of the first tube 12 away from the second tube 14. The sealing ring 30 is hermetically connected between the first tube 12 and the second tube 14. The fixing piece 40 is sleeved on the first tube 12 and the second tube 14. The fixing piece 40 is configured to fix the first tube 12 and the second tube 14.

The liquid pump with adjustable length of the embodiment of the present disclosure comprises the first tube 12 and the second tube 14, the first tube 12 and the second tube 14 are sleeved with each other, and the first tube 12 is slidable relative to the second tube 14, so that a length of the tube component 10 is flexibly adjusted according to a depth of the tank. Therefore, the liquid pump is capable of matching tanks of different depths, and is adapt to the tank that is deep, which avoids excessive exposure of the tube component 10 in the tank that is shallow, thereby ensuring safety and convenience of use of the liquid pump. Moreover, since the tube component 10 is telescopic, the tube component 10 is retracted to a shortest state during storage or transportation, reducing transportation costs and storage space requirements. The sealing ring 30 is mounted between the first tube 12 and the second tube 14, and is configured to seal a gap between the first tube 12 and the second tube 14, ensuring that when the first tube 12 slides to any position relative to the second tube 14, the gap between the first tube 12 and the second tube 14 is effectively sealed, thereby preventing the liquid from leaking from the gap between the first tube 12 and the second tube 14 during a liquid pumping process, thereby ensuring the sealing and safety of the liquid pumping process. The fixing piece 40 is sleeved on an outer side of the first tube 12 and an outer side of the second tube 14. The fixing piece 40 is configured to fix the first tube 12 and the second tube 14 after the first tube 12 and the second tube 14 are adjusted to a suitable position, ensuring that the first tube 12 and the second tube 14 are stably maintained in the suitable position after being extended and retracted, preventing the tube component 10 from accidentally extending and retracting during use, thereby improving the safety and stability of the liquid pump. Therefore, the liquid pump of the embodiments of the present disclosure realizes flexible adjustment of the length of the tube component 10, while taking into account sealing, stability and ease of use.

Figure 5:
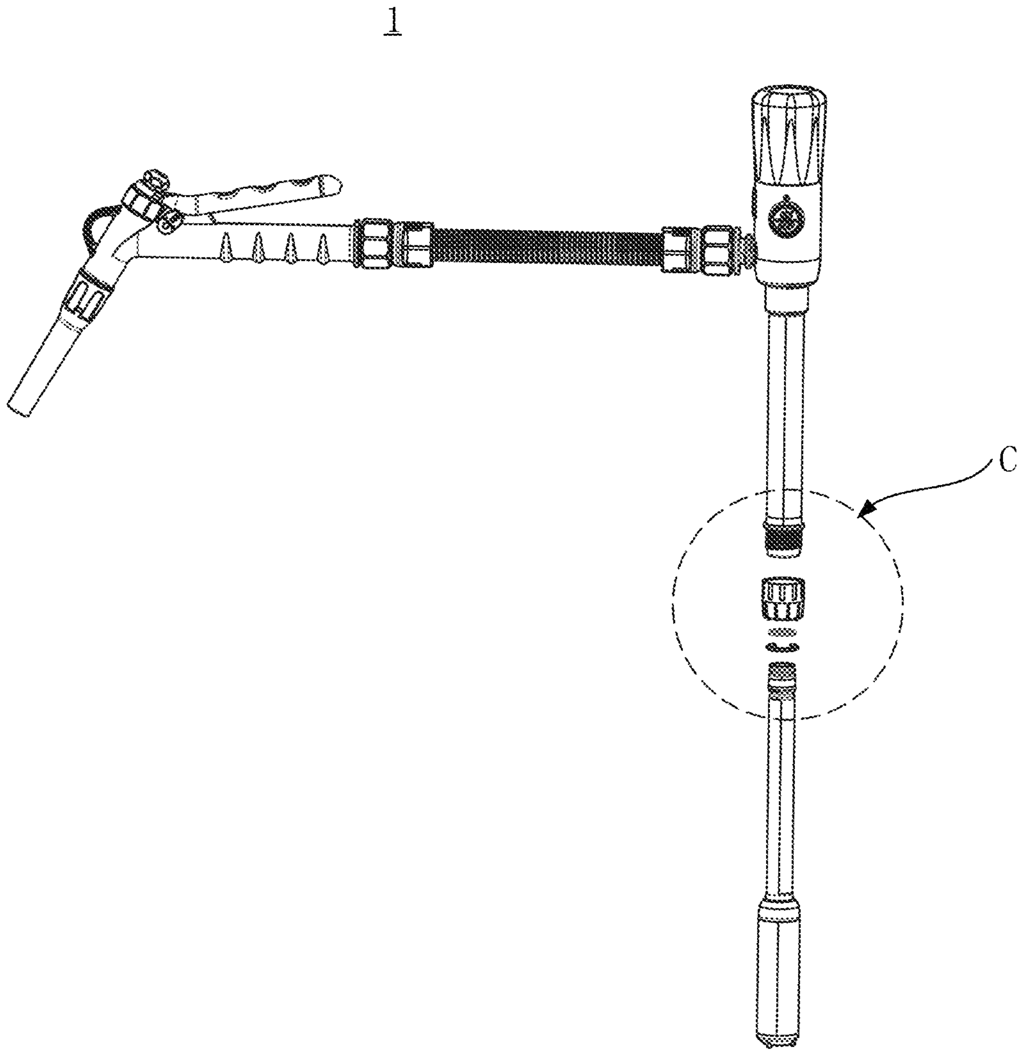
FIG. 5 is a partial exploded schematic diagram of the liquid pump with adjustable length shown in FIG. 1.
Figure 6:
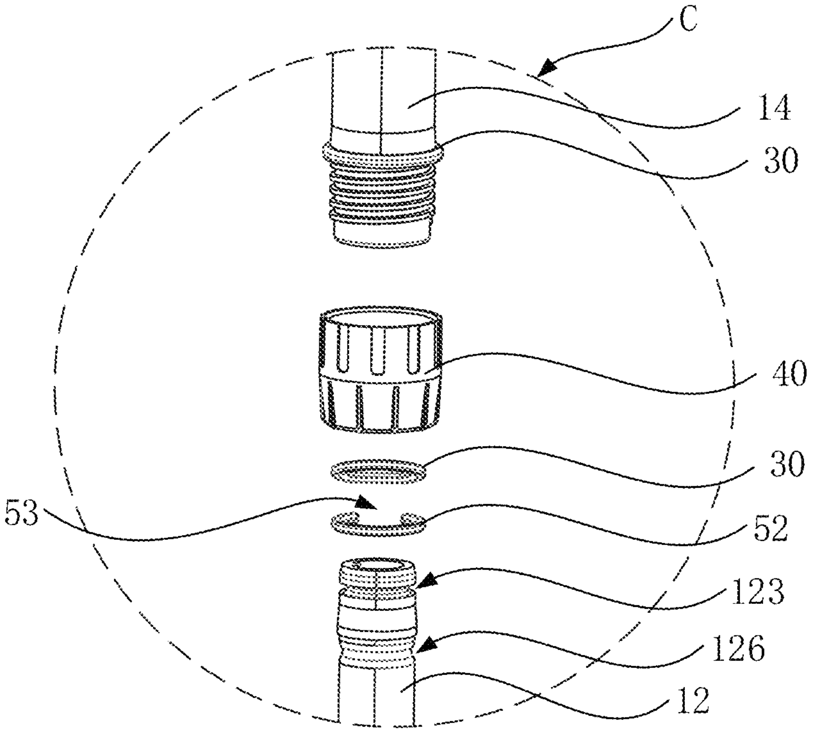
FIG. 6 is an enlarged schematic diagram of portion C of the liquid pump with adjustable length shown in FIG. 5.

As shown in FIGS. 5-6, FIG. 5 is a partial exploded schematic diagram of the liquid pump with adjustable length shown in FIG. 1, and FIG. 6 is an enlarged schematic diagram of portion C of the liquid pump with adjustable length shown in FIG. 5.

In some embodiments, the first tube 12 comprises a second end 122 away from the pump body 20. The second end 122 of the first tube 12 is disposed in the second tube 14. An outer periphery of the second end 122 of the first tube 12 defines an accommodating groove 123. The sealing ring 30 is disposed in the accommodating groove 123.

In the embodiment, the second end 122 of the first tube 12 away from the pump body 20 is disposed in the second tube 14, the accommodating groove 123 is defined on the outer periphery of the second end 122 of the first tube, and the sealing ring 30 is mounted in the accommodating groove 123. The accommodating groove 123 provides a precise positioning space for the sealing ring 30, so that the sealing ring 30 is stably embedded in the accommodating groove 123, thereby fixing the sealing ring 30 and preventing the sealing ring 30 from shifting or deflecting during a sliding process of the tube component 10. Therefore, the sealing ring 30 always maintains a close fit at any position where the first tube 12 and the second tube 14 slide relative to each other. The sealing ring 30 effectively seals the gap between the first tube 12 and the second tube 14, thereby improving the reliability and stability of sealing performance, and ensuring that the liquid is not leaked from the gap between the first tube 12 and the second tube 14 during the liquid pumping process. In addition, the arrangement further reduces maintenance cost caused by displacement or damage of the sealing ring 30, and further improves overall performance of the liquid pump 1.

For instance, the sealing ring 30 is made from an elastic material. Elastic properties of the elastic material not only ensure the sealing performance, but also provide a certain damping effect during extension and retraction of the tube component 10, so that the tube component 10 is stable during extension and retraction, thereby effectively reducing shaking of the tube component 10 caused by an external force or an improper operation, and further improving the use stability of the liquid pump 1.

In some embodiments, the second tube 14 comprises a first end 142 sleeved with the first tube 12. A protrusion 143 is disposed on an inner side of the first end 142 of the second tube 14. The second end 122 of the first tube 12 defines a limiting portion 124. The limiting portion 124 is disposed on one side of the protrusion 143 away from the pump body 20. The limiting portion 124 cooperates with the protrusion 143 to limit the first tube 12 from being separated from the second tube 14.

In the embodiment, the protrusion 143 is designed on the inner side of the first end 142 of the second tube 14, and the limiting portion 124 matched with the protrusion is disposed on the second end 122 of the first tube 12. When the first tube 12 slides to a longest extension state relative to the second tube 14, the protrusion 143 and the limiting portion 124 abut against each other to form a reliable mechanical stop, which effectively prevents the first tube 12 from accidentally separating from the second tube 14 at the longest extension length, and ensures that the tube component 10 remains stably connected even when pulled by the external force or the improper operation, thereby improving the safety and reliability of the liquid pump 1 during use.

In some embodiments, the limiting portion 124 comprises a step structure disposed on the outer periphery of the second end 122 of the first tube 12. The step structure is disposed on one side of the accommodating groove 123 facing the pump body 20.

In the embodiment, the limiting portion 124 is the step structure disposed on the outer periphery of the second end 122 of the first tube 12. The step structure cooperates with the protrusion 143 disposed on the inner side of the second tube 14 to effectively prevent the first tube 12 from being separated from the second tube 14 during the extension and retraction process, thereby ensuring stability of a connection between the first tube 12 and the second tube 14. Moreover, the step structure is disposed on the one side of the accommodating groove 123 that is configured to accommodate the sealing ring 30 and faces the pump body 20, so that the step structure is independent from the accommodating groove 123 while playing a limiting function, and the step structure does not affect the sealing function of the sealing ring 30 in the accommodating groove 123.

In some embodiments, at least part of areas of cross sections of the second end 122 of the first tube 12 gradually decreases in a direction away from the pump body 20. The second end 122 of the first tube 12 gradually decreases in the direction away from the pump body 20. When mounting the first tube 12 in the second tube 14, a gradually decrease structure of the second end 122 of the first tube 12 plays a good guiding role. A smaller front end thereof is easily aligned with an opening of the second tube 14 and is able to smoothly insert into the second tube 14, thereby reducing mounting difficulties. Moreover, the smaller front end easily guides an assembly of the tube component, reduce the difficulty and time of the assembly, and improves production efficiency. In addition, when the first tube 12 is extended or retracted in the second tube 14, a structure of the second end 122 of the first tube further plays a guiding role, ensuring that the first tube 12 is stably and smoothly slid in the second tube 14.

In some embodiments, the fixing piece 40 comprises a movable nut 42. A thread is disposed on an outer periphery of the first end 142 of the second tube 14. The movable nut 42 is screwed with the first end 142 of the second tube 14, so that the first tube 12 is fixed to the second tube 14.

In the embodiment, the fixing piece 40 is in a form of the movable nut 42, and the thread screwed with the movable nut 42 is disposed on the outer periphery of the first end 142 of the second tube 14, so that the movable nut 42 is tightly screwed with the second tube 14. When the first tube 12 and the second tube 14 are adjusted to the suitable position according to actual needs, the second tube 14 is tightly fixed to the first tube 12 by tightening the movable nut 42. A threaded connection between the movable nut 42 and the second tube 14 provides a reliable mechanical fixing force, which effectively prevents loosening of the first tube 12 and the second tube 14 due to unexpected external force or vibration after being extended into place, thereby significantly improving the stability and safety of the liquid pump 1 during use. Moreover, the movable nut 42 is adjustable, which allows a user to flexibly adjust the length of the tube component 10 according to different usage scenarios. Further, quick fixation of the first tube 12 relative to the second tube 14 is realized through a simple tightening operation, which greatly improves convenience and efficiency of operation.

In some embodiments, the liquid pump further comprises a clamping portion 50. The clamping portion 50 is disposed between the first tube 12 and the fixing piece 40. The clamping portion 50 is configured to limit the first tube 12 from sliding relative to the second tube 14.

In the embodiment, the clamping portion 50 disposed between the first tube 12 and the fixing piece 40 further effectively limit sliding of the first tube 12 relative to the second tube 14, thereby ensuring stability of the position of the tube component 10 during use. At the same time, the clamping portion 50 cooperates with the sealing ring 30 to further enhance friction and damping between the first tube 12 and the second tube 14. The sealing ring 30 provides a certain sealing and damping effect, and a configuration of the clamping portion 50 further enhances the damping effect. Through cooperation of the clamping portion 50 and the sealing ring 30, the sliding of the first tube 12 in the second tube 14 is more stable, reducing the shaking caused by the external force or the improper operation, and further enhancing the stability of the tube component 10 during the extension and retraction process.

In some embodiments, a limiting groove 126 is defined on the outer periphery of the second end 122 of the first tube 12. The clamping portion 50 is disposed in the limiting groove 126 to limit the first tube 12 from being separated from the second tube 14. When the first tube 12 slides to the longest extension state relative to the second tube 14, the clamping portion 50 is accurately embedded in the limiting groove 126. At this time, a cooperation between the clamping portion 50 and the limiting groove 126 plays a dual role. Specifically, on the one hand, the clamping portion 50 limits the first tube 12 from sliding outward, thereby preventing the first tube 12 from being separated from the second tube 14. On the other hand, the clamping portion 50 provides a stable support point for the first tube 12 at the longest extension length, ensuring that the first tube 12 and the second tube 14 maintain a reliable connection during use.

In some embodiments, the clamping portion 50 is not elastically deformed when disposed in the limiting groove 126. In the embodiment, when the first tube 12 is extended to the longest extension state relative to the second tube 14, the clamping portion 50 is accurately embedded in the limiting groove 126 defined on the outer periphery of the second end 122 of the first tube 12. At this time, the clamping portion 50 maintains an original shape and does not undergo elastic deformation, which effectively prevents the clamping portion 50 from being in an elastic deformation state for a long time. Therefore, material fatigue or performance degradation of the clamping portion is prevented, thereby protecting the clamping portion 50, extending service life thereof, and ensuring that the clamping portion 50 maintains a good elastic deformation effect when needed.

In some embodiments, the clamping portion 50 is elastic. When the clamping portion 50 is disposed outside the limiting groove 126. The clamping portion 50 is elastically deformed and clamped between the first tube 12 and the fixing piece 40. When the first tube 12 slides into the second tube 14 to other retracting states, the clamping portion 50 is separated from the limiting groove 126. At this time, the clamping portion 50 is elastically deformed due to the interaction with the first tube 12 and the fixing piece 40. The clamping portion 50 is elastically deformed, so that the clamping portion 50 is able to fit closely with the first tube 12, thereby limiting the first tube 12 to a certain extent and preventing the first tube 12 from accidentally sliding or separating. By switching the clamping portion 50 between an elastic deformation state and a non-deformation state, the stability of the first tube 12 in different extending and retracting states is ensured.

It should be noted that when the clamping portion 50 is disposed in the limiting groove 126, the clamping portion 50 may be slightly deformed, and a slight elastic deformation thereof further enhances a contact tightness between the clamping portion 50 and the limiting groove 126, thereby playing a certain degree of limiting effect on the first tube 12, and further maintaining the stability of the first tube 12 in the longest extension state, which is not limited thereto.

In some embodiments, the clamping portion 50 comprises a clamping ring 52. The clamping ring 52 defines a notch 53, so that the clamping ring 52 is elastically deformable along a radial direction of the first tube 12. The clamping portion 50 may be a clamping ring 52 with a notch 53. A configuration of the notch 53 enables the clamping ring 52 to have an ability to elastically deform along the radial direction of the first tube 12. Specifically, the notch 53 enables the clamping ring 52 to be flexibly opened or closed during use, so that the clamping ring is sleeved on the outer periphery of the first tube 12 or in the limiting groove 126. When the clamping ring 52 is disposed in the limiting groove 126, a shape of the clamping ring 52 is matched with the limiting groove 126. At this time, the clamping ring 52 is not elastically deformed, or the clamping ring 52 is slightly elastically deformed, and the clamping ring 52 is in a relatively open state. When the clamping ring 52 is separated from the limiting groove 126, the clamping ring 52 generates a certain elastic restoring force in the radial direction of the first tube 12, so that the clamping ring 52 is tightly sleeved on the first tube 12, and the clamping ring 52 is in a relatively tight state, thereby increasing a friction force between the clamping ring 52 and the first tube 12. The increased friction force not only makes the first tube 12 less likely to slide to a certain extent, but also provides a stable damping effect during the extension and retraction process to prevent the first tube 12 from accidentally moving due to the external force or the vibration. In addition, the configuration of the notch 53 further makes the clamping ring 52 more convenient to mount during the assembly, so that the clamping ring 52 is easily sleeved on the first tube 12. Exemplarily, the clamping ring 52 is made of metal.

In another embodiment, the clamping portion 50 may be the clamping ring 52 without the notch 53. For instance, the clamping ring 52 is a complete plastic ring, which produces moderate elastic deformation during assembly and use.

In some embodiments, the fixing piece 40 comprises a sleeve portion 44 and a limiting end portion 46. The sleeve portion 44 is sleeved on the second tube 14. A first end of the sleeve portion 44 facing the pump body 20 exceeds the second tube 14 and is disposed opposite to the first tube 12. A second end of the sleeve portion 44 facing he pump body 20 defines the limiting end portion 46 protruding toward the first tube 12. The clamping portion 50 is disposed between the second tube 14 and the limiting end portion 46.

In some embodiments, when the movable nut 42 is tightened. The clamping portion 50 abuts between the second tube 14 and the limiting end portion 46.

In the embodiment, the sleeve portion 44 of the fixing piece 40 is sleeved on the outer periphery of the second tube 14, the first end of the sleeve portion 44 facing the pump body 20 exceeds the second tube 14, and the sleeve portion 44 is disposed opposite to the first tube 12. The limiting end portion 46 protrudes from the second end of the sleeve portion 44 toward the pump body 20, so as to form a structure extending toward the first tube 12. A space is formed between the limiting end portion 46 and the second tube 14, and the clamping portion 50 is disposed in the space. Specifically, the clamping portion 50 is disposed in the space between the second tube 14 and the limiting end portion 46, the clamping portion is disposed around the first tube 12, and the clamping portion 50 is limited by the sleeve portion 44 and the first tube 12 to ensure the limiting effect on the first tube 12 in the radial direction.

When the movable nut 42 is tightened, an axial pressure is applied to the clamping portion 50, so that the clamping portion 50 is tightly abutted between the second tube 14 and the limiting end portion 46, which ensures that the clamping portion 50 is fixed in the axial direction, ensures longitudinal stability of the clamping portion 50, and limits the axial sliding of the first tube 12. The clamping portion 50 is limited by the second tube 14 and the limiting end portion 46 in the axial direction. In addition, the axial pressure generated by tightening the movable nut 42 further enhances the friction force between the clamping portion 50 and the first tube 12, thereby more effectively limiting the sliding of the first tube 12 and improving the reliability and stability of the connection between the first tube body 12 and the second tube 14.

In some embodiments, the clamping portion 50 is disposed on one side of the sealing ring 30 facing the pump body 20.

In the embodiment, the clamping portion 50 is disposed on the one side of the sealing ring 30 facing the pump body 20 along the axial direction of the first tube 12, that is, the clamping portion 50 is in a portion where the first tube 12 inserted into the second tube 14. Along the axial direction of the first tube 12, the sealing ring 30 is disposed above the clamping portion 50. The sealing ring 30 and the clamping part 50 cooperate with each other in function and do not interfere with each other. The sealing ring 30 is configured to seal the gap between the first tube 12 and the second tube 14 to ensure that the liquid does not leak. The clamping portion 50 limits the sliding of the first tube 12 by cooperating with the fixing piece 40 to ensure the stability of the first tube during the extension and retraction process. Moreover, the sealing ring 30 is relatively disposed above the clamping portion 50 to provide damping and the friction force, and the clamping portion 50 is disposed below the sealing ring 30 to provide damping and the friction force. The dual damping and the dual friction force further enhances the stability of the first tube 12 during the extension and retraction process.

In some embodiments, a protruding ring 144 is disposed on the outer periphery of the first end 142 of the second tube 14, and the protruding ring 144 is disposed adjacent to the thread and is disposed on one side of the thread away from the pump body 20.

In the embodiment, the movable nut 42 is screwed with the outer periphery of the first end 142 of the second tube portion 14. After being tightened to a predetermined position, the protruding ring 144 prevents the movable nut 42 from continuing to move away from the pump body 20. When the movable nut 42 is tightened in place, an end surface thereof abuts against the protruding ring 144, thereby forming a physical limit structure, which effectively limits a further movement of the movable nut 42 and ensures that the movable nut 42 remains stable after being tightened at the predetermined position.

In some embodiments, the liquid pump 1 further comprises a liquid outlet device 60. The liquid outlet device 60 is connected to a second end of the second tube 14 away from the first tube 12. The liquid outlet device 60 is configured to control discharge of the liquid.

In one embodiment, the liquid pump 1 further comprises the liquid outlet device 60. The liquid outlet device 60 is connected to the second end of the second tube 14 away from the first tube 12. A main function of the liquid outlet device 60 is configured to control the discharge of the liquid. The liquid outlet device 60 is configured to output and stop outputting the liquid, so that the liquid pump 1 is able to flexibly control a delivery of the liquid according to needs during use, which improves the convenience and efficiency of operation while avoiding waste or accidental leakage of the liquid. Therefore, practicality and safety of the liquid pump 1 are improved.

In some embodiments, the first tube 12 and the second tube 14 extend along a first direction. The liquid pump further comprises a third tube 10, the third tube 10 extends along a second direction. The second tube 14 is connected to the liquid outlet device through the third tube 10. The first direction is different from the second direction.

In the embodiment, the second tube 14 is connected to the liquid outlet device 60 through the third tube 70. After the liquid is delivered from the first tube 12 and the second tube 14 to the third tube 70, the liquid finally reaches the liquid outlet device 60 and is output by changing a direction thereof, thereby realizing flexible adjustment of the liquid delivering direction.

The liquid pump 1 is configured to pump different liquids, such as fuel, water, lubricating oil, coolant, edible oil, chemical reagents, etc. Correspondingly, the liquid pump 1 may be an oil pump, a water pump, etc.

The present disclosure provides a feed tank. The feed tank comprises a tank configured to store the liquid and the liquid pump 1 mentioned above. The liquid pump 1 is mounted in the tank. The liquid pump 1 is configured to discharge the liquid stored in the tank. The liquid is the fuel, the water, the lubricating oil, the coolant, the edible oil, the chemical reagents, etc. Correspondingly, the feed tank may be an oil tank, a water tank, etc.

The liquid pump 1 with adjustable length of the embodiments of the present disclosure comprises the first tube 12 and the second tube 14, the first tube 12 and the second tube 14 are sleeved with each other, and the first tube 12 is slidable relative to the second tube 14, so that the length of the tube component 10 is flexibly adjusted according to the depth of the tank. Therefore, the liquid pump is capable of matching tanks of different depths. The sealing ring 30 is mounted between the first tube 12 and the second tube 14, and is configured to seal the gap between the first tube 12 and the second tube 14, ensuring that when the first tube 12 slides to any position relative to the second tube 14, the gap between the first tube 12 and the second tube 14 is effectively sealed, thereby preventing the liquid from leaking. The fixing piece 40 is sleeved on the outer side of the first tube 12 and the outer side of the second tube 14. The fixing piece 40 is configured to fix the first tube 12 and the second tube 14 after the tube component 1*n* is adjusted to a suitable position, ensuring that the first tube 12 and the second tube 14 are stably maintained in the suitable position after being extended or retracted, preventing the tube component 10 from accidentally extending and retracting during use, thereby improving the safety and stability of the liquid pump 1.

By integrating the liquid pump 1 with adjustable length into the feed tank, not only efficient storage and delivery of the liquid is achieved, but also the telescopic function and sealing performance of the liquid pump 1 with adjustable length enable the feed tank to adapt to the tanks of different depths, while ensuring the stability and reliability of the liquid delivery process. Further, versatility and operational convenience of the feed tank are improved, and the practicality and market competitiveness of the liquid pump are further enhanced.

In the above-mentioned embodiments, descriptions of each embodiment have their own emphasis. For parts that are not described in detail or recorded in one embodiment, reference may be made to related descriptions of other embodiments. The embodiments, implementations and related technical features of the present disclosure can be combined and replaced with each other without conflict.

The above embodiments of the present disclosure provide a detailed illustration to the liquid pump with adjustable length and the feed tank. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A liquid pump with adjustable length, comprising:

a tube component;

a pump body;

a sealing ring; and a fixing piece;

wherein the tube component comprises a first tube and a second tube, the first tube and the second tube are sleeved with each other, the first tube is slidable relative to the second tube, the pump body is mounted in a first end of the first tube away from the second tube, the sealing ring is hermetically connected between the first tube and the second tube, the fixing piece is sleeved on the first tube and the second tube, and the fixing piece is configured to fix the first tube and the second tube;

wherein the first tube comprises a second end away from the pump body, the second end of the first tube is disposed in the second tube, an outer periphery of the second end of the first tube defines an accommodating groove, and the sealing ring is disposed in the accommodating groove;

wherein the second tube comprises a first end sleeved with the first tube, and a protrusion is disposed on an inner side of the first end of the second tube;

wherein the second end of the first tube defines a limiting portion, the limiting portion is disposed on one side of the protrusion away from the pump body, and the limiting portion; wherein the fixing piece comprises a movable nut, a thread is disposed on an outer periphery of the first end of the second tube, the movable nut is screwed with the first end of the second tube, so that the first tube is fixed to the second tube.

2. The liquid pump with adjustable length according to claim 1, wherein the limiting portion comprises a step structure disposed on the outer periphery of the second end of the first tube, and the step structure is disposed on one side of the accommodating groove facing the pump body.

3. The liquid pump with adjustable length according to claim 1, wherein at least part of areas of cross sections of the second end of the first tube gradually decreases in a direction away from the pump body.

4. The liquid pump with adjustable length according to claim 1, wherein the liquid pump further comprises a clamping portion, the clamping portion is disposed between the first tube and the fixing piece, and the clamping portion is configured to limit the first tube from sliding relative to the second tube.

5. The liquid pump with adjustable length according to claim 4, wherein a limiting groove is defined on the outer periphery of the second end of the first tube, and the clamping portion is disposed in the limiting groove to limit the first tube from being separated from the second tube.

6. The liquid pump with adjustable length according to claim 5, wherein the clamping portion is not elastically deformed when disposed in the limiting groove.

7. The liquid pump with adjustable length according to claim 5, wherein the clamping portion is elastic, and when the clamping portion is disposed outside the limiting groove, the clamping portion is elastically deformed and clamped between the first tube and the fixing piece.

8. The liquid pump with adjustable length according to claim 7, wherein the clamping portion comprises a clamping ring, and the clamping ring defines a notch, so that the clamping ring is elastically deformable along a radial direction of the first tube.

9. The liquid pump with adjustable length according to claim 4, wherein the fixing piece comprises a sleeve portion and a limiting end portion, the sleeve portion is sleeved on the second tube, a first end of the sleeve portion facing the pump body exceeds the second tube and is disposed opposite to the first tube, a second end of the sleeve portion facing he pump body defines the limiting end portion protruding toward the first tube, and the clamping portion is disposed between the second tube and the limiting end portion.

10. The liquid pump with adjustable length according to claim 9, wherein when the movable nut is tightened, the clamping portion abuts between the second tube and the limiting end portion.

11. The liquid pump with adjustable length according to claim 4, wherein the clamping portion is disposed on one side of the sealing ring facing the pump body.

12. The liquid pump with adjustable length according to claim 1, wherein a protruding ring is disposed on the outer periphery of the first end of the second tube, and the protruding ring is disposed adjacent to the thread and is disposed on one side of the thread away from the pump body.

13. The liquid pump with adjustable length according to claim 1, wherein the liquid pump further comprises a liquid outlet device, the liquid outlet device is connected to a second end of the second tube away from the first tube, and the liquid outlet device is configured to control discharge of a liquid.

14. The liquid pump with adjustable length according to claim 13, wherein the first tube and the second tube extend along a first direction, the liquid pump further comprises a third tube, the third tube extends along a second direction, the second tube is connected to the liquid outlet device through the third tube, and the first direction is different from the second direction.

15. The liquid pump with adjustable length according to claim 1, wherein the sealing ring is made from an elastic material.

16. A feed tank, comprising:

a tank configured to store a liquid; and the liquid pump according to claim 1;

wherein the liquid pump is mounted in the tank, and the liquid pump is configured to discharge the liquid stored in the tank.

* * * * *